(12) United States Patent
Khoshnevisan et al.

(10) Patent No.: US 6,751,009 B2
(45) Date of Patent: Jun. 15, 2004

(54) ACOUSTO-MICRO-OPTIC DEFLECTOR

(75) Inventors: Mohsen Khoshnevisan, Newbury Park, CA (US); Ian McMichael, Port Hueneme, CA (US); Manouchehr E. Motamedi, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/135,098

(22) Filed: Apr. 30, 2002

(65) Prior Publication Data
US 2003/0202236 A1 Oct. 30, 2003

(51) Int. Cl.[7] .............................. G02F 1/33; G02F 1/11
(52) U.S. Cl. ..................... 359/305; 359/285; 359/307; 359/310
(58) Field of Search ............................. 359/305–308, 359/310–312, 245, 285, 287, 321–323, 366, 569; 356/300

(56) References Cited

U.S. PATENT DOCUMENTS

| | | | |
|---|---|---|---|
| 4,200,794 A | 4/1980 | Newberry | 250/396 ML |
| 4,602,852 A | 7/1986 | Moroz | 359/311 |
| 5,309,178 A * | 5/1994 | Gross | 347/255 |
| 5,805,743 A | 9/1998 | Iwamoto | 385/7 |
| 6,195,448 B1 * | 2/2001 | Schiller | 382/126 |
| 6,236,479 B1 * | 5/2001 | Gosselin et al. | 359/117 |
| 6,384,920 B1 * | 5/2002 | Goltsos | 356/601 |
| 6,577,429 B1 * | 6/2003 | Kurtz et al. | 359/279 |

FOREIGN PATENT DOCUMENTS

JP       10-300420       * 11/1998

* cited by examiner

Primary Examiner—Georgia Epps
Assistant Examiner—William Choi
(74) Attorney, Agent, or Firm—Harness Dickey & Pierce P.L.C.

(57) ABSTRACT

An acousto-micro-optic deflector (AMOD) is provided. This device uses a special combination of an acousto-optic deflector (AOD) and a micro-optic deflector (MOD) to provide agile gimballess beam steering over large angles. The combination is driven such that the entire field of regard of the device is accessible, and continuous contact with the target point is maintained.

16 Claims, 3 Drawing Sheets

λ = Wavelength
Θ = Steering Angle
d = Lenslet Diameter
D = Total Array Apperature/ Beam Size
F/# = Lenslet F/Number

ACOUSTO-MICRO-OPTIC DEFLECTOR

FIELD OF THE INVENTION

The present invention relates to optical beam steering and more particularly to an acousto-micro-optic deflector for performing such optical beam steering.

BACKGROUND OF THE INVENTION

High resolution steering of optical beams is of significant interest for a variety of applications, including free space laser communication, laser illumination, laser designation, laser radar, pointing and tracking, and remote optical sensing. Current steering systems commonly rely on mechanical gimbals. Such gimbal-based systems are slow and prone to mechanical failure.

It is highly desirable to have high resolution and fast agile beam steering without reliance on mechanical gimbals. Existing fast non-gimbaled solutions include acousto-optics, liquid crystals, electro-optics, micro-optics, small and fast galvanometer or magnetic mirrors, and micro-mirror arrays made by microelectromechanical system (MEMS) technologies. In their current configurations, none of these existing fast non-gimbaled solutions fully meets the needs of many potential users for agile beam steering.

In practice, in order to cover large total angular ranges, beam deflector devices have cascaded fast steering elements with a larger, slower element, for fine and coarse beam steering, respectively. For example, a fast magnetic or galvanometer-driven fine scanner is placed in tandem with a larger gimbaled mirror, resulting in a higher resolution scanner system, but with some applications issues.

Conventional mirror based cascade systems have a number of shortfalls, such as reliance on gimbals, slow effective response, and being relatively large in overall size and weight. Other combinations of fast beam deflectors have suffered from the tradeoff between speed and angular range. A problem common to all conventional tandem/cascaded beam deflectors has been the transient loss of the beam on target during the time that the fine scanner resets back to its starting position. This problem is sometimes referred to in the art as a "flyback" problem.

Depending on the speed of the target/receiver, a flyback condition can happen many times a second, and can be a serious disadvantage for applications such as high bandwidth free space laser communication with a moving target. Such periodic transient loss of the beam on the target can cause the loss of substantial amounts of data, increase bit errors, and possibly lose target contact if the target is moving rapidly.

SUMMARY OF THE INVENTION

An acousto-micro-optic deflector (AMOD) is provided. This device uses a special combination of an acousto-optic deflector (AOD) and a micro-optic deflector (MOD). The combination is driven such that the entire field of regard of the device is accessible, and continuous contact with the target point is maintained.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is directed towards an acousto-micro-optic deflector (AMOD) which combines an acousto-optic deflector (AOD) and a micro-optic deflector (MOD). The deflection properties of an acousto-optic deflector and a micro-optic deflector are extremely complementary. The acousto-optic deflector and micro-optic deflector are both relatively fast scanners. The acousto-micro-optic deflector is also fast and able to achieve large fields of view with very high resolution. In combination, each contributes its advantages, and each compensates for the other's shortfalls, which to date have kept each of them from more widespread use in beam steering applications for laser communication and other large angle deflector applications.

Figure 1:
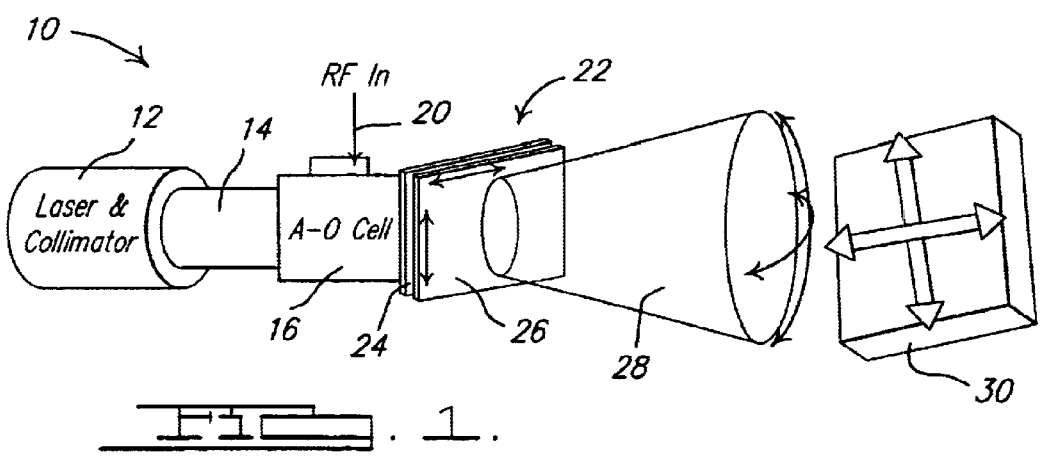
FIG. 1 is a conceptual diagram of an acousto-micro-optic deflector, showing the acousto-optic deflector (AOD) and micro-optic (MOD) deflector stages.

Referring to FIG. 1, one embodiment of the acousto-micro-optic deflector device of the present invention is shown generally at 10. The acousto-micro-optic deflector 10 includes a laser and collimator 12 generating a laser beam 14. An acousto-optic deflector stage 16 is positioned downstream of the laser 12 and in radiation receiving relation to the laser beam 14. The acousto-optic stage 16 includes an acousto-optic cell 18 which receives the beam 14 and an RF voltage 20. The RF voltage 20 controls the acoustic frequency of the acousto-optic stage 16. In a two dimensional acousto-optic deflector, two RF voltages are provided. The acoustic frequency varies the diffraction angle of the incident laser beam 14.

A micro-optic deflector stage 22 is positioned downstream of the acousto-optic stage 16 (the micro-optic stage 22 is used as a coarse deflector to scan over large angles). The micro-optic stage 22 includes at least two microlens arrays 24 and 26. The microlens arrays 24 and 26 are orthogonally translatable relative to one another and to the output of the acousto-optic stage 16. The combination of the acousto-optic stage 16 and micro-optic stage 22 produces a scanned agile beam 28. The beam 28 is illustrated directed towards a far field continuous 2-D pattern 30.

Figure 2:
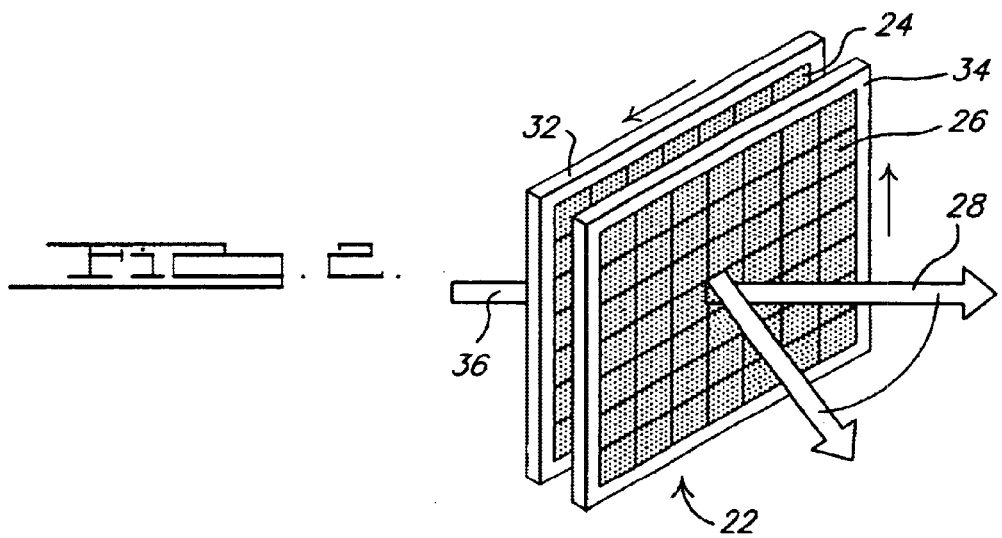
FIG. 2 is a schematic diagram of a micro-optic deflector.

Turning to FIG. 2, the micro-optic stage 22 is illustrated in greater detail. The micro-optic stage 22 consists of first microlens array 24 and second microlens array 26 formed on thin substrates 32 and 34. The first substrate 32 is placed parallel to the second substrate 34 such that the focal planes of the microlenses in the arrays 24 and 26 coincide. If desired, more than two layers of microlens arrays may be used to achieve high optical quality beams.

A parallel incident beam 36 exits the microlens stage 22 (i.e., the arrays 24 and 26) at specific deflected angles as beam 28 (see also FIG. 1). The angle of deflection of beam 28 depends on the optical power (i.e., F-number (F#)) of the lenses in the arrays 24 and 26 and relative offset of the axes of the microlenses. Small in-plane displacements of the microlens arrays 24 and 26 with respect to each other, such as orthogonal translations, allows control over the exit angles of the beam 28.

The microlens stage 22 is very compact and micro-translation of the microlens arrays 24 and 26 contained therein in the x- and y-directions allows beam scanning in two dimensions. In each direction, a total translation equal to +/−d/2 allows access to the full angular range of the acousto-micro-optic deflector device 10 (FIG. 1) in that direction, where d is the diameter of one microlens. The required displacements are small and coarse angle steering is relatively fast (~milliseconds, depending on size).

The maximum steering angle in each direction is given by:

$$\Theta_{max} = +/-\arctan[1/(2 \cdot F\#)]$$

where F#=f/d, and f is the focal length of each microlens. The steering angle of the micro-lens stage 22 can be large, e.g., +/−26 degrees for F#1, and +/−45 degrees for F#0.5 microlenses at 1.0 micron wavelength. It is important to note that such fast lenses are much easier to fabricate as microlenses, than as bulk lenses of the same F#.

If acting alone, the far field illumination with the microlens stage 22 is by interference of multiple beams exiting the microlenses. As such, only specific discrete spots in the far field can be accessed. The points in between the spots cannot be accessed. This is a clear disadvantage of an isolated microlens stage.

Figure 3:
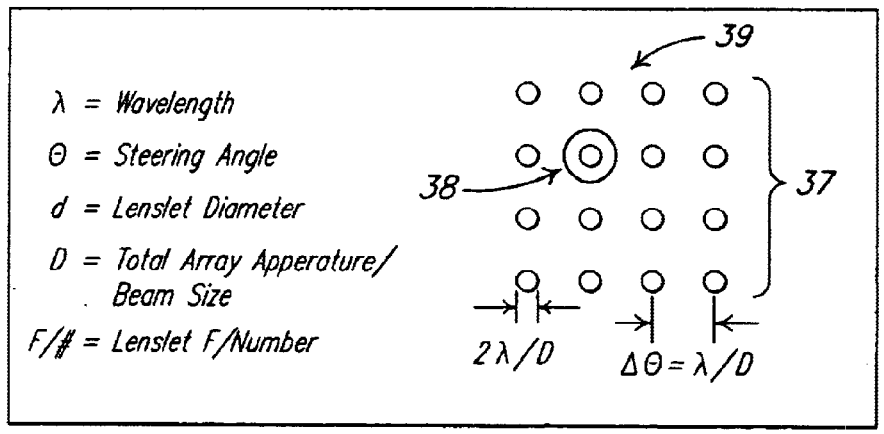
FIG. 3 is a schematic diagram of the allowed spots for a micro-optic deflector in the far field wherein any one allowable spot may be selected by proper setting of the position of micro-optic lens arrays in the micro-optic deflector.

More particularly and referring now to FIGS. 2 and 3, the far field accessible spot pattern 37 for the micro-optic stage 22 is illustrated. The apparent diameter (i.e., angular width) of each spot W, and the center to center angular spacing between adjacent spots S are given by:

$$W \approx 2*\lambda/D \text{ and } S \approx \lambda/d$$

where λ is the free space light wavelength and D is the overall dimension of the microlens array 24/26. For well-designed and fabricated microlens arrays and a well-aligned system, proper lens alignment can access any one of the allowed spots within the spot pattern 38 in the far field. As such, essentially all of the input beam 36 will arrive at one spot, e.g., spot 38. (Imperfections may result in energy spilling in the adjacent spots as well.)

The input beam 36 can be transferred to an adjacent spot, e.g., spot 39, by micro-translation of the microlens arrays 24 and 26. This allows the adjacent spot 39 to "light up", as the original spot 38 begins to "fade". During this transition, the total beam energy is shared between the spots 38 and 39. Continued translation in the same direction will eventually transfer all of the beam energy to the next spot, and so on. This process can be done in two dimensions as well by applying x- and y-translations either in series or in parallel. At no time will any beam energy actually reach the points between the allowed spots 37 in the far field. As such, the access points in the far field with an isolated micro-optic stage are discontinuous.

Figure 4:
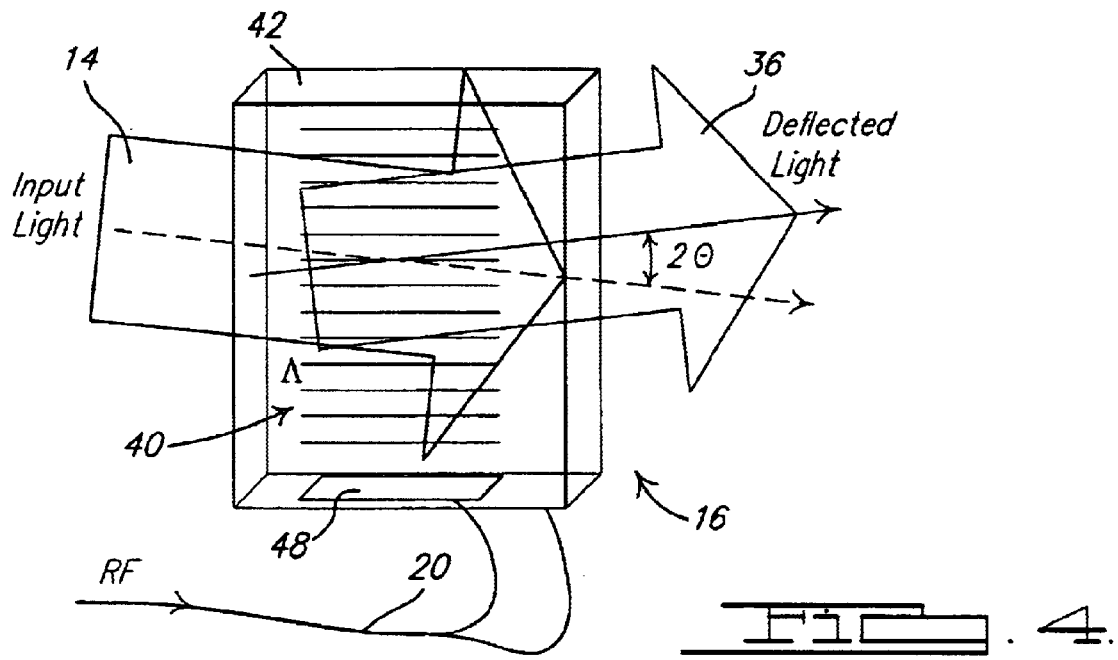
FIG. 4 is a diagram of an acousto-optic deflector.

Turning now to FIG. 4, the acousto-optic stage 16 is illustrated in greater detail. The acousto-optic stage 16 operates by launching a high frequency acoustic wave 40 in a photoelastic medium 42. This results in formation of an index grating which diffracts incident laser light 14 (see also FIG. 1) if certain conditions are met.

In order to achieve diffraction of the single output beam 36 (which is used in the micro-optic stage 22 as illustrated in FIG. 2), the following Bragg condition must be met:

$$2\Lambda \sin \Theta = \lambda/n$$

where n is the index of refraction of the medium, and Λ is the period of the index grating, which is closely related to the acoustic frequency $f_a$ and the sound velocity V in the medium:

$$\Lambda = V/f_a.$$

The acoustic frequency is generally produced by application of an appropriate RF voltage 20 with frequency $f_a$ to a piezoelectric transducer 48. Changing the acoustic frequency $f_a$ varies the diffraction angle of the incident laser light 14 with very high resolution.

The number of resolvable spots (N) of the acousto-optic stage 16 is given by:

$$N = \Delta f_a \cdot T = (\Delta f_a \cdot L)/V$$

where $\Delta f_a$ is the 3 dB frequency bandwidth of the acousto-optic device 10 (FIG. 1) (full width at half maximum of efficiency), and T is the transit time of the acoustic wave 40 across the aperture of acousto-optic stage 16 having a length L.

For typical high efficiency acousto-optic deflector materials, the resolution is on the order of 50 spots per millimeter of aperture. Commercial acousto-optic deflectors are available for visible or infrared operation with resolutions of a few hundred up to 2000 spots, depending on the aperture size and the photoelastic material. These acousto-optic deflectors can be cascaded to form 2-dimensional steering or be integrated as 2-D devices.

Acousto-optic deflectors are exceedingly fast, typically about 1 microsecond per millimeter of aperture. They allow either continuous scanning of the beam by sweeping the RF frequency, or random access, by abruptly changing the RF frequency, causing a jump of the diffracted beam to the destination spot.

Acousto-optic deflectors have a relatively large number of resolvable spots. However, the angular range of an isolated acousto-optic deflector is relatively small, typically only a few degrees. This is of the same order of separation S as the discrete spots of micro-optic scanners in the far field.

Referring again to FIG. 1, in the preferred design, the acousto-micro-optic deflector device 10 has the full range of angular deflection of the acousto-optic stage 16 slightly exceed the spot-to-spot separation of the micro-optic deflector 22. In this way, the entire far field can be covered, and the total number of resolvable spots can be enormously high since it is the product of the acousto-optic number of spots, multiplied by the total number of spots produced by the micro-optic array.

The acousto-micro-optic deflector 10 utilizes the advantages of the acousto-optic stage 16, and simultaneously overcomes its small angular range problem by using the acousto-optic stage 16 ahead of the larger angle deflector micro-optic stage 22 in the optical train. This allows the acousto-optic stage 16 to continuously cover the spaces between any two adjacent spots of the micro-optic stage 22, i.e., the far field zones inaccessible by the micro-optic stage 22 alone.

As described above with reference to FIG. 4, the scanning of the acousto-optic stage 16 is based on changing the frequency of the RF voltage 20 driving the acoustic transducer 48 of the stage 16. Light is deflected in the acousto-optic medium 42 from the transient gratings formed by the acoustic pressure wave 40. Only light wavelengths that meet the Bragg condition in the acousto-optic device are deflected:

$$\sin \Theta = \lambda/2n\Lambda$$

where $\lambda$ is the free space wavelength, $\Theta$ is the deflection angle, n is the medium's index of refraction, and $\Lambda$ is the spacing of the acousto-optic grating, and controlled by the applied RF frequency.

For a fixed wavelength of light, changing the frequency of the RF field causes a change in the period of the Bragg grating $\Lambda$, resulting in a beam deflection at a different angle $\Theta$. Sound travels rapidly in solid materials, so the acousto-optic stage 16 is extremely fast (typically tens of microseconds). Further the acousto-optic stage 16 has random access capability, by abrupt changes of RF frequency, or continuous scan capability by continuous change of the applied frequency.

A unique property of the acousto-optic stage 16 not shared by other scanners is that it can be driven with more than one frequency simultaneously. This results in two or more spots in the far field. This feature is used in the present invention to overcome the "flyback" problem faced by other tandem type scanners.

The efficiency of the acousto-optic stage 16 is determined by materials used, and the amplitude of the RF power applied. The acousto-micro-optic deflector 10 exploits this feature in the following ways: 1) If two acoustic frequencies are simultaneously applied, the acousto-optic stage 16 splits the input light beam and produces two output beams (this feature is used in the acousto-micro-optic deflector 10 to provide a solution for the fine scanner flyback problem); 2) the acousto-optic stage 16 can diffract the deflected light and cause a polarization flip if it uses shear acoustic beams (this feature is useful in the design of duplex laser communication systems, where some of the incoming signal separation from the outgoing transmit beam may be done by polarization selection); and 3) the phase of the acoustic signal also affects the phase of the outgoing optical signal (this feature makes it possible for phased arrays of acousto-optic deflectors, using individual devices as sub-apertures of a phased array system).

The acousto-micro-optic deflector 10 includes the acousto-optic stage 16 ahead of the micro-optic stage 22 to make a new beam deflector system. This arrangement allows the overall device 10 to cover the maximum far field angular range of the micro-optic stage 22 completely and continuously at high speeds. The net effect of the acousto-optic stage 16 is to shift the input beam 14 to the micro-optic stage 22 as if the micro-optic stage 22 is being illuminated off-axis. This will virtually shift the entire available spot array of the micro-optic stage 22 in the far field, so the new micro-optic deflector spots with the acousto-optic stage 16 correspond to locations between the micro-optic deflector spots without the acousto-optic stage 16. Such spots would be inaccessible to an isolated micro-optic deflector (without the acousto-optic stage 16 being present).

Figure 5:
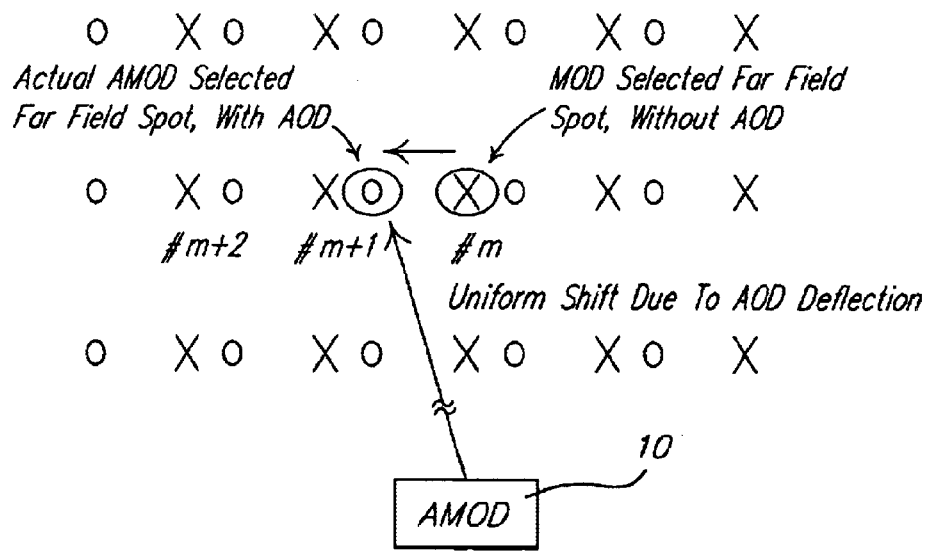
FIG. 5 is a schematic illustration depicting the acousto-micro-optic deflector of the present invention accessing the spaces between the micro-optic deflector accessible spot array in the far field wherein the acousto-optic deflector causes a uniform shift of the entire micro-optic deflector spot array by the amount of acousto-optical deflector deflection, in this case, shown shifted in one-dimension only (horizontal)

Referring now also to FIG. 5, the acousto-micro-optic deflector 10 matches the angular range of the acousto-optic stage 16 to the angular separation S of any two adjacent far field accessible spots X of the micro-optic stage 22. When the scan of the acousto-optic stage 16 moves the beam 28 continuously from one spot of the micro-optic stage 22 (for example, spot "m") to an adjacent spot of the micro-optic stage 22 (spot "m+1"), the acousto-optic stage 16 uses up its frequency bandwidth. The frequency ($f_1$) of the acousto-optic stage 16 for keeping the beam at spot m, can be increased until its high frequency limit ($f_2$) for moving the beam to spot m+1 is nearly reached. In practice, the acoustic frequencies corresponding to the starting spot m and next discrete spot m+1, or $f_1$ and $f_2$, respectively, would be selected to be nearly the minimum and maximum 3-dB frequencies of the acousto-optic stage 16.

When the scan of the acousto-optic stage 16 is approaching m+1, micro-translation of the micro-optic arrays 24 and 26 is initiated until the micro-optic stage 22 takes the adjacent spot m+1 over from the acousto-optic stage 16. The acousto-optic stage 16 then resets back to its starting position and begins coverage of the spots between the new micro-optic stage 22 spot m+1 with frequency $f_1$, and its next allowable spot m+2 with frequency $f_2$, and so on.

Contrary to other cascade deflector systems, the flyback or resetting process for the acousto-optic stage 16 can be done without total loss of contact with the ending spot m+1 of the micro-optic stage 22 during the flyback. Beam energy will be at the correct spot at all times, even during the resetting or flyback of the acousto-optic stage 16 frequency, since the transition is done by a transient introduction of two-frequency ($f_1$ and $f_2$) operation for the acousto-optic stage 16 until resetting is completed. In order to stabilize optical power at the desired spot, it is desirable to apply increased RF power during the two-frequency transition period.

The acousto-micro-optic deflector 10 discussed above allows the insertion of the full number of acousto-optic resolvable spots N between any two adjacent discrete spots of the micro-optic far field. The number of resolvable spots for the acousto-micro-optic deflector 10 is obtained as a multiplication of those for the acousto-optic stage 16 and the micro-optic stage 22. For example, for an acousto-optic stage 16 with 500 resolvable spots, and a micro-optic stage 22 with 100 discrete spots in the far field, the total resolution is 50,000 spots in one dimension, or over two billion spots in two dimensions. For two-dimensional scanning, a 2-dimensional acousto-optic stage 16 and a micro-optic stage 22 with the capability to translate the microlens arrays in two dimensions are required.

Figure 6:
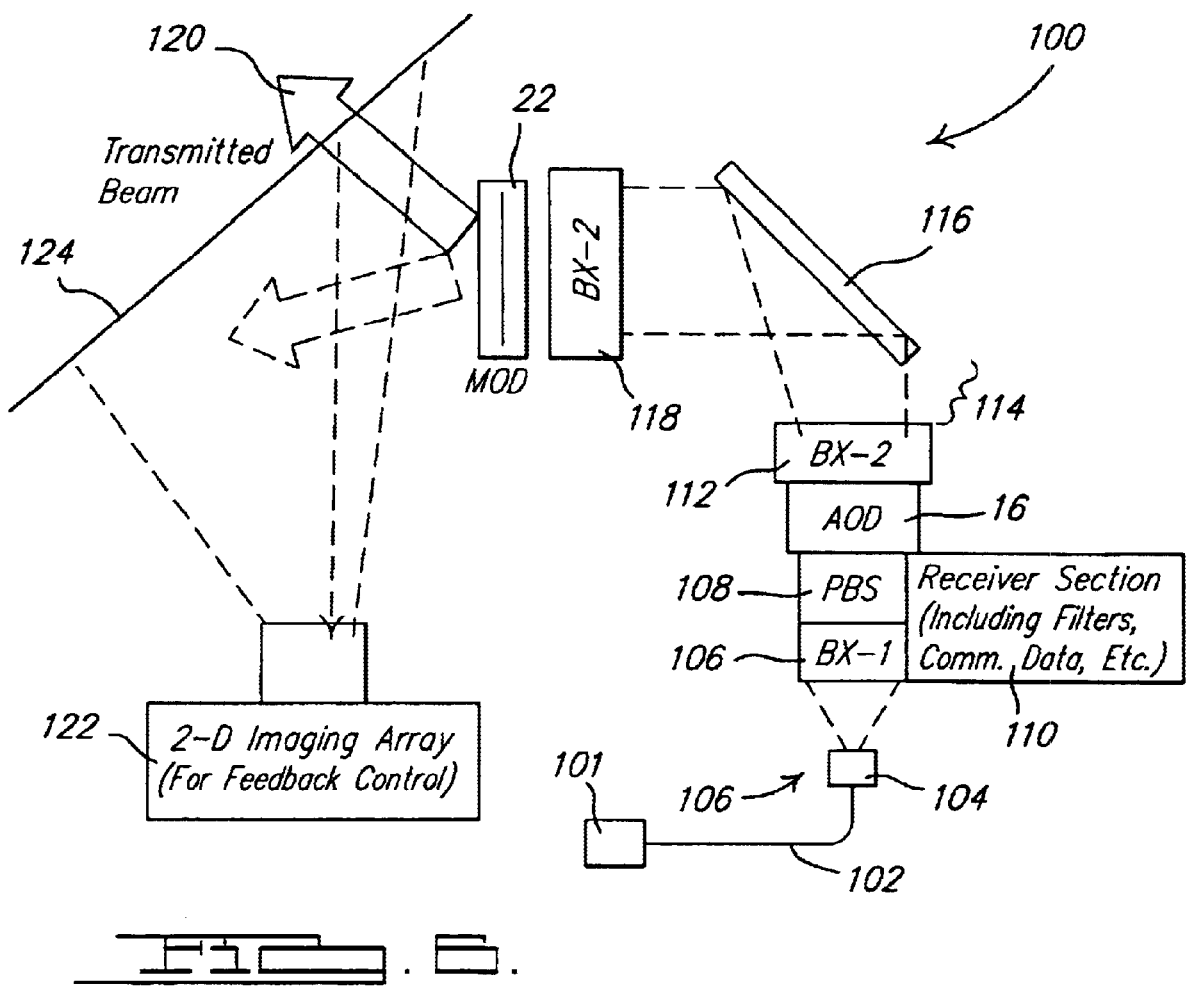
FIG. 6 is a schematic illustration of the acousto-micro-optic deflector of the present invention depicting feedback control.

In cases where a return beam is expected, the acousto-optic stage 16 and micro-optic stage 22 components of acousto-micro-optic deflector 10 can operate in reverse simultaneously. This allows duplex operation in laser radar or laser communication, for example. Therefore, as shown in FIG. 6, the acousto-micro-optic deflector 10 may be used in such duplex systems. The ability of acousto-optic stage 16 to cause polarization flip for the deflected beam can be useful in developing filtering and discrimination of the scattered light from the strong outgoing beam, versus the weak incoming beam in the acousto-micro-optic deflector 10.

Still referring to FIG. 6, the system 100 includes a laser source 101, which may be direct or through fibers 102 from a modulated laser or fiber switch. The fibers 102 are coupled to an input end 104 of a first beam expander 106. An output end 105 of the first beam expander 106 illuminates a polarizing beam splitter 108. The polarizing beam splitter 108 and first beam expander 106 form part of a receiver section 110 which includes various filters, communication data and the like.

The acousto-optic stage 16 for fine steering is disposed downstream of the polarizing beam splitter 108. An input end 112 of a second beam splitter 114 is disposed downstream of the acousto-optic stage 16. A folding mirror 116 is disposed downstream of the input end 112 of the second beam splitter 114. An output end 118 of the second beam splitter 114 is disposed downstream of the folding mirror 116.

The micro-optic stage 22 is disposed adjacent the output end 118 of the second beam splitter 114. The micro-optic stage 22 outputs the transmitted beam 120. The transmitted beam 120 is sampled by a 2-D imaging array 122 for performing feedback control, based on a small reflection from one face of the exit window or a beam splitter 124.

The 2-D imaging system shown in FIG. 6 can be used to determine the pointing direction of the outgoing beam 120 of the acousto-micro-optic deflector 10, so relatively high pixel resolution is important. In combination with calibration data from the acousto-optic stage 16 and micro-optic stage 22 and feedback from the sensors on the micro-position of the micro-optic stage 22 setting, the system can be made very accurate in pointing and tracking.

Figure 7:
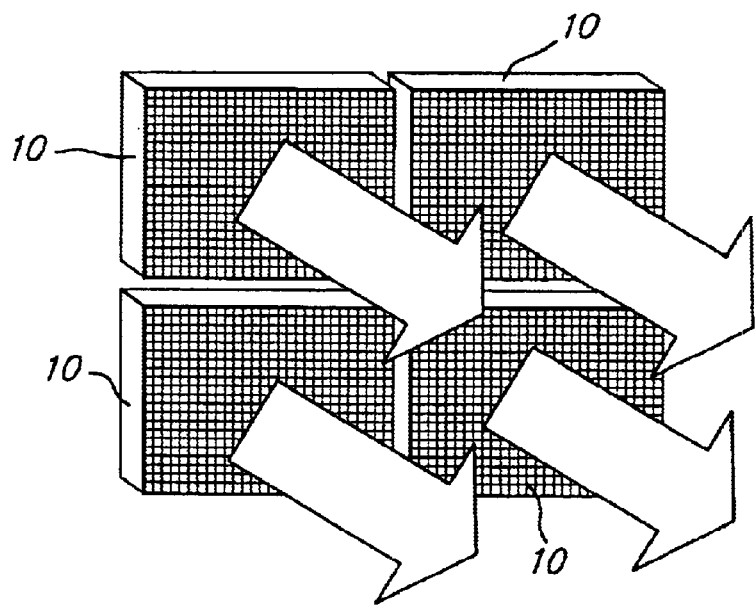
FIG. 7 is a schematic diagram of phased acousto-micro-optic deflector arrays.

Turning to FIG. 7, it is possible to construct phased arrays of a plurality of acousto-micro-optic deflectors 10 and use the phase of the acoustic beam (i.e., the phase of the RF voltage driving the transducers) to control the phase of the light deflected in any sub-aperture acousto-micro-optic deflectors 10, and implement phasing of the array. In this case, the phasing can be either uniform to simulate a larger aperture as shown in FIG. 7, or the phases on the acousto-micro-optic deflector 10 sub-apertures can be non-uniform, to allow phase compensation, for example, due to atmospheric aberrations.

In view of the foregoing it can be appreciated that the acousto-micro-optic deflector of the present invention provides a complementary combination of two existing beam deflection technologies, which to date have not been used for large angle agile beam steering, due to their inherent limitations, namely the fundamental inability of micro-optic deflectors to cover the far field continuously, and the problem of small range of deflection angles for acousto-optic deflectors. The acousto-micro-optic deflector takes full advantage of the capabilities of these deflectors, while overcoming their limitations. The result is a new agile beam steering system possessing the key capabilities of extremely high resolution, large angle steering, fast and continuous coverage.

The acousto-micro-optic deflector of the present invention also realizes some additional capabilities not available with micro-optic deflectors or acousto-optic deflectors, or any other tandem beam steering system based on a fast fine scan and slower coarse scan combination. These additional advantages include resetting or flyback of the fast steering element, without transient loss of beam energy at the target, polarization flip beam steering to facilitate polarization discrimination for duplex transmit/receive systems, and the capability for phasing sub-arrays of acousto-micro-optic deflector steering devices to form large effective apertures and/or ability to perform limited wavefront corrections.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An optical beam steering device comprising:

a laser source;

an acousto-optic deflector disposed in radiation receiving relation relative to said laser source; and a micro-optic deflector disposed in radiation receiving relation relative to said acousto-optic deflector;

wherein said micro-optic deflector further comprises at least two microlens arrays disposed adjacent one another, said microlens arrays being translatable relative to one another.

2. The device of claim 1 wherein said acousto-optic deflector is selected from the group consisting of one-dimensional and two-dimensional acousto-optic deflectors.

3. The device of claim 2 wherein said micro-optic deflector is selected from the group consisting of one-dimensional and two-dimensional micro-optic deflectors.

4. The device of claim 1 wherein said micro-optic deflector Is selected from the group consisting of one-dimensional and two-dimensional micro-optic deflectors.

5. The device of claim 1 wherein said at least two microlens arrays are selected from the group including symmetric and asymmetric lens arrays.

6. An optical beam steering device comprising:

a laser source;

an acousto-optic deflector disposed in radiation receiving relation relative to said laser source;

a micro-optic deflector disposed in radiation receiving relation relative to said acousto-optic deflector, said micro-optic deflector including at least two microlens arrays disposed adjacent one another; and a detector array disposed downstream of said micro-optic deflector for providing at least one of open and closed loop feedback.

7. An array of deflectors comprising:

a laser source;

at least two deflectors disposed adjacent one another downstream of said laser source, each of said deflectors including:

an acousto-optic deflector; and a micro-optic deflector disposed downstream of said acousto-optic deflector.

8. A method comprising:

defining a far field spot field including a plurality of spots within an access range of a micro-optic deflector;

cascading an acousto-optic deflector with said micro-optic deflector; and shifting said access range of said micro-optic deflector with said acousto-optic deflector so as to include a plurality of points between said plurality of spots within said far field spot field.

9. The method of claim 8 further comprising:

continuously capturing said plurality of points between said plurality of spots within said far field spot field with said acousto-optic deflector.

10. The method of claim 8 further comprising:

matching a full range of deflection angles in each direction of said acousto-optic deflector for one spot in said far field spot field with a full range of deflection angles in each direction of said micro-optic deflector for an adjacent spot in said far field spot field.

11. The method of claim 8 further comprising:

blocking a residual undeflected portion of a beam in the acousto-optic deflector; and scanning and accessing the plurality of points between said plurality of spots within said far field spot field with a deflected portion of the beam.

12. The method of claim 8 further comprising:

detecting a time when said acousto-optic deflector shifts said micro-optic deflector from one spot to another spot within said far field spot field;

thereafter, performing a scan with the micro-optic deflector by translating at least one micro-optic array of said micro-optic deflector; and resetting said acousto-optic deflector to a starting frequency.

13. The method of claim 12 further comprising:

operating said acousto-optic deflector in a simultaneous two-frequency mode immediately before said time.

14. The method of claim 13 further comprising:

increasing a power of an RF voltage applied to said acousto-optic deflector during said simultaneous two-frequency mode.

15. The method of claim 8 further comprising:

using a reflection from an outgoing beam of the cascaded acousto-optic deflector with said micro-optic deflector in a detector array to provide at least one of open and closed loop feedback.

16. The method of claim 8 comprising:

simultaneously operating said cascaded acousto-optic deflector with said micro-optic deflector acousto-micro-optic deflector in a forward direction and a reverse direction.

* * * * *